May 13, 1958  G. R. BOND, JR  2,834,366
VALVE FOR GAS FLOW
Filed Jan. 11, 1957
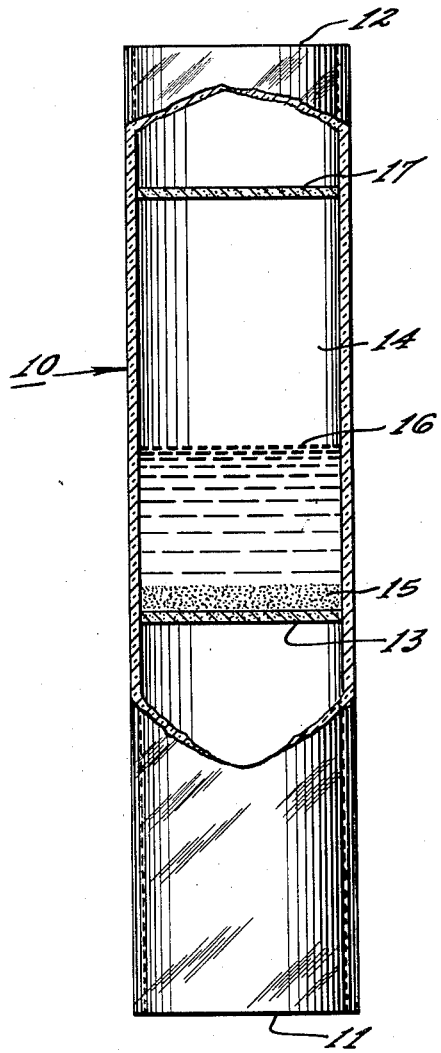
INVENTOR.
George R. Bond, Jr.
BY John R. Ewbank
ATTORNEY.

United States Patent Office 2,834,366
Patented May 13, 1958

2,834,366

VALVE FOR GAS FLOW

George R. Bond, Jr., Paulsboro, N. J., assignor to Houdry Process Corporation, Wilmington, Del., a corporation of Delaware Application January 11, 1957, Serial No. 633,782

3 Claims. (Cl. 137—251)

This invention relates to check valves for gases, and is especially suitable for dust-free streams of highly corrosive gases.

Heretofore one-way valves have generally utilized either a resilient movable member or a rigid movable member to close off the flow of gas shortly after the transition from normal forward gas flow to the reverse flow. Various maintenance problems have been encountered in the use of ordinary check valves, especially those adversely affected by corrosive gases.

In accordance with the present invention, an appropriately positioned fluidizing chamber acts as a check valve permitting normal upflow of gas, but permitting the fluidizable solids to settle as a nearly impermeable bed soon after the initiation of downflow of the gas.

In the accompanying drawing, Fig. 1 illustrates one embodiment of the invention. A one-inch tube 10 of thermal-resistant glass is positioned vertically and includes a lower portion serving as a gas inlet 11 and an upper portion serving as a gas exit 12. A porous plate 13, such as a fritted glass disc, is positioned horizontally across the tube 10. Finely divided particles having a size several times the average port size of the porous plate 13, but small enough to be fluidizable are maintained in a fluidizing chamber 14. Chemical engineering textbooks describe the control of factors such as gas density, gas velocity, particle density, and particle size in order to attain and maintain fluidization, which prior art controls are not a part of the present invention. Spherically-shaped silica particles having diameters between about 400 and 800 microns are readily fluidized by moderate upward velocities of air. During adverse backpressure conditions, or even when there is no pressure difference between the inlet 11 and exit 12, the silica particles rest as a compact bed 15 upon the porous plate 13. The compact bed 15 should have a depth from about 10% to about 33% of the longest dimension of the plate 13 in order to minimize channelling through the bed, especially if the bed depth is less than about 20 mm. If the ratio of longest plate dimension to average depth of the dormant bed 15 is less than about 10, the repose angle of coned piles of silica particles tends to make the particles automatically heal the early stages of channelling. Thus, the silica particles will tend to be either a compact bed 15 nearly impervious to downflow of gases or fluidized by gases upwardly flowing uniformly across both lateral dimensions of the porous plate 13.

The fluidized solids tend to form a fluidized bed 16 of a depth generally predetermined by the relationship between the gas flow and suspension characteristics of the silica particles. The depth of the fluidized bed 16 is desirably about one-half the depth of the fluidizing chamber, from about three to about ten times the depth of the compact bed, and less than about three times the longest lateral dimension of the porous plate 13. Any particles ejected above the fluidized bed 16 generally fall back into the fluidized bed before reaching a ceiling 17 of the fluidizing chamber 14. The ceiling 17 may be a porous plate similar to the fritted glass plate 13, or it may be dome-shaped or otherwise modified, its purpose being merely to provide an attrition resistant barrier preventing any silica particles from passing into the exit 12, but providing a minimum resistance to the flow of gases therethrough.

In the operation of the valve, the upflowing gases pass into the inlet 11, through the porous plate 13, through the fluidized bed 16 (thereby maintaining the particles in a fluidized condition), through that portion of the fluidizing chamber 14 above the fluidized bed 16, through the porous ceiling 17, and out of the valve through the exit 12. In such normal operation, the pressure drop between the inlet 11 and exit 12 is relatively small. If adverse conditions develop so that the pressure in the exit 12 exceeds the pressure in the inlet, then the silica particles are quickly compressed into what can be conveniently designated as an approximately impermeable compact bed 15, and any further back flow of gas is prevented by the approximately impermeable bed 15. The simplicity of this check valve makes it feasible for it to close off the gas line often without requiring maintenance or replacement of worn components.

Altho designed primarily for preventing adverse backflow of gases, the valve can also have some regulatory effect upon forward (upward) flow of gases at the extremes of the possible range of gas velocities. If the pressure at the gas inlet 11 is only very slightly greater than the pressure at the gas outlet, then almost no gas will flow, inasmuch as a measurable pressure difference is necessary for fluidizing the silica particles. Under some conditions, the fluidizing chamber can act as an intermittently open valve permitting flow at a predetermined pressure but stopping flow whenever the pressure is below the predetermined level.

If the gas velocity becomes quite excessive, the silica particles may get blown against the ceiling 17 of the fluidizing chamber 14, thus providing a shallow compact bed against the ceiling, serving as a partial barrier to the flow of the gas, and reducing the pressure in the exit 12 to a moderate level. However, under the conditions of the predetermined range of normal flow, the silica particles do not rest against the ceiling 17, because the depth of the fluidized bed 16 occupies not more than about the bottom half of the depth of the fluidizing chamber 14.

The ceiling 17 may be of either a larger or smaller cross section than the plate 13, and various other modifications may be made without departing from the concept of utilizing the fluidized bed 16 as a check valve. In order to remove any particles in the gas stream subsequent to the fluidized bed 16, an electrostatic precipitator, cyclone dust remover, or other suitable apparatus may be employed in lieu of the preferred porous ceiling 17. The materials of construction are chosen in view of the corrosive properties of the gas to be controlled. Any corrosion-resistant materials of construction may be employed, the reference to glass being merely an illustrative example. The solids in the fluidized bed need not be silica, but may be graphite, titania or any other material not adversely affected by the gas.

Obviously many modifications and variations of the present invention as hereinbefore set forth may be made without departing from the spirit and scope thereof and therefore only such limitations should be imposed as are indicated in the appended claims.

The invention claimed is:

1. A check valve adapted to permit gases to flow in one direction and adapted automatically to close upon cessation of forward flow, and adapted to prevent reverse flow, said check valve consisting of: a substantially vertical tube having a gas entry at a lower portion thereof; a horizontal porous plate positioned across the passageway of said vertical tube and adapted to permit passage of the gas therethrough without loss of a significant portion of the pressure thereof; a quantity of fluidizable solids forming a compact bed at least about 2 mm. deep and at least as deep as one tenth the longest lateral dimension of the porous plate, said compact bed of fluidizable solids resting on said porous plate during periods when no gas flows upwardly through said plate; a fluidizing chamber in said vertical tube above said porous plate, in which chamber the fluidizable solids are maintained as a fluidized bed by the normal upflow of gases; means for preventing the fluidizable solids from being blown out from the fluidizing chamber, but permitting gases to flow therethrough without loss of a significant portion of the pressure thereof; and a gas exit at the upper portion of said vertical tube, said fluidizable solids being fluidized in said fluidizing chamber during normal upward flow of gases through the check valve, but said fluidizable solids forming a gas impermeable bed on said porous plate during the absence of upward flow of gases.

2. A check valve in accordance with claim 1, the vertical tube, porous plate, and means for preventing the fluidizable solids from being blown from the fluidizing chamber, all being of a corrosion-resistant material having the same thermal expansion characteristics.

3. A check valve in accordance with claim 1 in which a porous ceiling of the fluidizing chamber serves as the means for preventing the fluidizable solids from being blown from the fluidizing chamber.

References Cited in the file of this patent

UNITED STATES PATENTS

| | | |
|---|---|---|
| 2,670,749 | Germer | Mar. 2, 1954 |
| 2,719,537 | Gildersleeve | Oct. 4, 1955 |

FOREIGN PATENTS

| | | |
|---|---|---|
| 253,900 | Germany | Nov. 18, 1912 |